United States Patent [19]

Kohda et al.

[11] Patent Number: 4,939,018

[45] Date of Patent: Jul. 3, 1990

[54] RADIATION IMAGE STORAGE PANEL

[75] Inventors: Katsuhiro Kohda; Kenji Takahashi, both of Kanagawa, Japan

[73] Assignee: Fuji Photo Film Co., Ltd., Minami-ashigara, Japan

[21] Appl. No.: 308,940

[22] Filed: Feb. 3, 1989

Related U.S. Application Data

[63] Continuation of Ser. No. 851,524, Apr. 14, 1986, abandoned.

[30] Foreign Application Priority Data

| | | | |
|---|---|---|---|
| Apr. 12, 1985 | [JP] | Japan | 60-78155 |
| Apr. 13, 1985 | [JP] | Japan | 60-78748 |
| Apr. 13, 1985 | [JP] | Japan | 60-78749 |

[51] Int. Cl.[5] .......................... B32B 19/04; G03C 5/16

[52] U.S. Cl. .................................. 428/192; 250/327.2; 250/484.1; 428/690

[58] Field of Search ............... 428/192, 690, 689, 691; 250/327.2, 483.1, 484.1

[56] References Cited

U.S. PATENT DOCUMENTS

| | | | |
|---|---|---|---|
| 2,907,882 | 10/1959 | Patten | 428/690 X |
| 4,491,620 | 1/1985 | Joiner, Jr. | 428/691 X |
| 4,563,580 | 1/1986 | Ishizuka et al. | 428/690 X |
| 4,574,102 | 3/1986 | Arakawa et al. | 428/690 X |
| 4,666,774 | 5/1987 | Christini | 428/690 X |

*Primary Examiner*—James Seidleck

*Attorney, Agent, or Firm*—Sixbey, Friedman, Leedom & Ferguson

[57] ABSTRACT

A radiation image storage panel comprising a support, a phosphor layer which comprises a binder and a stimulable phosphor dispersed therein and a protective film, superposed in this order, which is characterized in that said protective film comprises a plastic material and has a water vapor transmission of not higher than 45 $g/m^2.24$ hrs.

13 Claims, 4 Drawing Sheets

RADIATION IMAGE STORAGE PANEL

This application is a continuation of Ser. No. 06/851,524, filed 4/14/86, now abandoned.

BACKGROUND OF THE INVENTION

1. Field of the Invention

This invention relates to a radiation image storage panel comprising a support, a phosphor layer which comprises a binder and a stimulable phosphor dispersed therein and a protective film, superposed in this order.

2. Description of Prior Arts

For obtaining a radiation image, there has been conventionally employed a radiography utilizing a combination of a radiographic film having an emulsion layer containing a photosensitive silver salt and a radiographic intensifying screen.

As a method replacing the conventional radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at considerably smaller dose, as compared with the conventional radiography. Accordingly, this method is of great value especially when the method is used for medical diagnosis.

The radiation image storage panel employed in the radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or having radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image storage panel is generally employed repeatedly in the radiation image recording and reproducing method, because the panel is hardly deteriorated by exposure to a radiation such as X-rays and stimulating rays. Accordingly, the protective film of the panel provided on the surface of the phosphor layer preferably has a large thickness from the viewpoint of physical or chemical protection of the phosphor layer, such protection being a principal purpose of the protective film. However, the radiation image storage panel is generally read out from the protective film-side surface of the panel upon exposure to stimulating rays, and hence from the viewpoint of image quality such as sharpness, the thickness of the protective film is desired to be as small as possible.

As the transparent protective film of the panel having a small thickness and high hardness, there has been conventionally employed a polyethylene terephthalate film having a thickness of approx. 10–20 $\mu$m.

However, it has been now discovered that this useful polyethylene terephthalate film has a drawback in that it shows a high water vapor transmission. Especially when the stimulable phosphor to be contained in the phosphor layer is easily deteriorated upon absorption of water to cause lowering of emission luminance thereof (i.e., in the case that the phosphor lacks water-vapor resistance), it is necessary to provide a protective film having a low water vapor transmission onto the surface of the phosphor layer. In more detail, provision of the protective film having a low water vapor transmission on the phosphor layer can prevent water (i.e., moisture) in an atmosphere from permeating the phosphor layer so as to protect the phosphor layer from deterioration caused by water.

SUMMARY OF THE INVENTION

It is an object of the present invention to provide a radiation image storage panel which is improved in the resistance to permeation of water vapor.

It is another object of the present invention to provide a radiation image storage panel which is excellent in the resistance to pearmeation of water vapor with no lowering in other various properties thereof.

The objects can be accomplished by a radiation image storage panel comprising a support, a phosphor layer which comprises a binder and a stimulable phosphor dispersed therein and a protective film, superposed in this order, which is characterized in that said protective film comprises a plastic material and has a water vapor transmission of not higher than 45 $g/m^2 \cdot 24$ hrs.

In the invention, the term "water vapor transmission" means an amount of water vapor passing through a filmy material per unit area for 24 hours under the conditions of a temperature of 60° C. and a relative humidity of 80% RH, and is measured according to a water vapor transmission test (Cup method) defined is JIS-Z-0208.

Thus, the present invention provides a radiation image storage panel which is improved in the water-vapor resistance by providing a protective film of a plastic material having a low water vapor transmission onto the surface of the phosphor layer.

In other words, since the protective film of the radiation image storage panel according to the invention is a thin plastic film having a water vapor transmission of not higher than 45 $g/m^2 \cdot 24$ hrs, water contained in an atmosphere is prominently prevented from permeating the phosphor layer, whereby the phosphor layer, particularly the stimulable phosphor contained therein, can be protected from deterioration caused by contact with water.

According to the invention, a protective film having a low water vapor transmission can be formed on the phosphor layer with no increase of the thickness of the film as compared with the conventional protective film, and hence a radiation image storage panel having high resistance to permeation of water vapor can be obtained without lowering quality of the resulting image provided thereby.

Particularly, according to the invention, even if the stimulable phosphor to be employed in the radiation image storage panel is one which is easily deteriorated in various properties such as emission luminance in contact with water, the lowering of sensitivity of the panel caused by the deterioration of the phosphor can be effectively prevented because the phosphor layer is protected from permeation of water.

The present invention further provides a radiation image storage panel comprising a support, a phosphor layer which comprises a binder and a stimulable phosphor dispersed therein and a protective film, superposed in this order, which is characterized in that substantially whole side surface of said phosphor layer is coated with a sealing material, the sealing material being kept in contact with the side surface of the phosphor layer by aid of a fixing means arranged in contact therewith on the outer surface thereof.

The present invention furthermore provides a radiation image storage panel comprising a support, a phosphor layer which comprises a binder and a stimulable phosphor dispersed therein and a protective film, superposed in this order, which is characterized in that substantially whole side surface of said phosphor layer is coated with an extended portion of the protective layer which is in part in contact with an extended portion of the support, the area at which the both extended portions are in contact with each other being sealed with a sealing means.

Thus, the sealing means arranged on the side of the phosphor layer is also effective to keep the phosphor layer from permeation of water vapor contained in the surrounding atmosphere. The arrangement of the sealing means is more effectively employed in combination with the protective film having a low water vapor transmission to keep the phosphor layer from permeation of water vapor contained in the surrounding atmosphere.

As the stimulable phosphor having unsatisfactory water-vapor resistance, there can be mentioned the following phosphors:

a divalent europium activated alkaline earth metal fluorohalide phosphor [$M^{II}F(X_{1-x},I_x):Eu^{2+}$, in which $M^{II}$ is an alkaline earth metal, X is at least one halogen selected from the group consisting of Cl and Br, and x is number satisfying the condition of $0<x\leqq 1$], which is a known stimulable phosphor employable for a radiation image storage panel;

a novel divalent europium activated alkaline earth metal halide phosphor filed by the present applicant ($M^{II}XX':Eu^{2+}$, in which $M^{II}$ *is an alkaline earth metal, each of X and X' is a halogen other than fluorine*);

a novel bismuth activated alkali metal halide phosphor ($M^{I}X:Bi$, in which $M^{I}$ is an alkali metal, X is a halogen other than fluorine); and a rare earth element activated rare earth oxyhalide phosphor (LnOX:A, in which Ln is at least one element selected from the group consisting of La, Y, Gd and Lu, X is at least one halogen selected from the group consisting of Cl and Br, A is at least one element selected from the group consisting of Ce and Tb).

The present inventor has discovered that the above-described stimulable phosphors are not satisfactory in the resistance to water and sometimes cause lowering of sensitivity of the resulting panel depending upon the environmental conditions such as humidity and temperature when they are contained in the phosphor layer of the panel, and hence they can be hardly endured to be employed for a long period of time. According to the present invention, even when such phosphors having low water-vapor resistance are contained in the phosphor layer, the lowering of sensitivity of the resulting panel can be prominently reduced because the protective film provided on the phosphor layer has a low water vapor transmission.

DETAILED DESCRIPTION OF THE INVENTION

Figure 1:
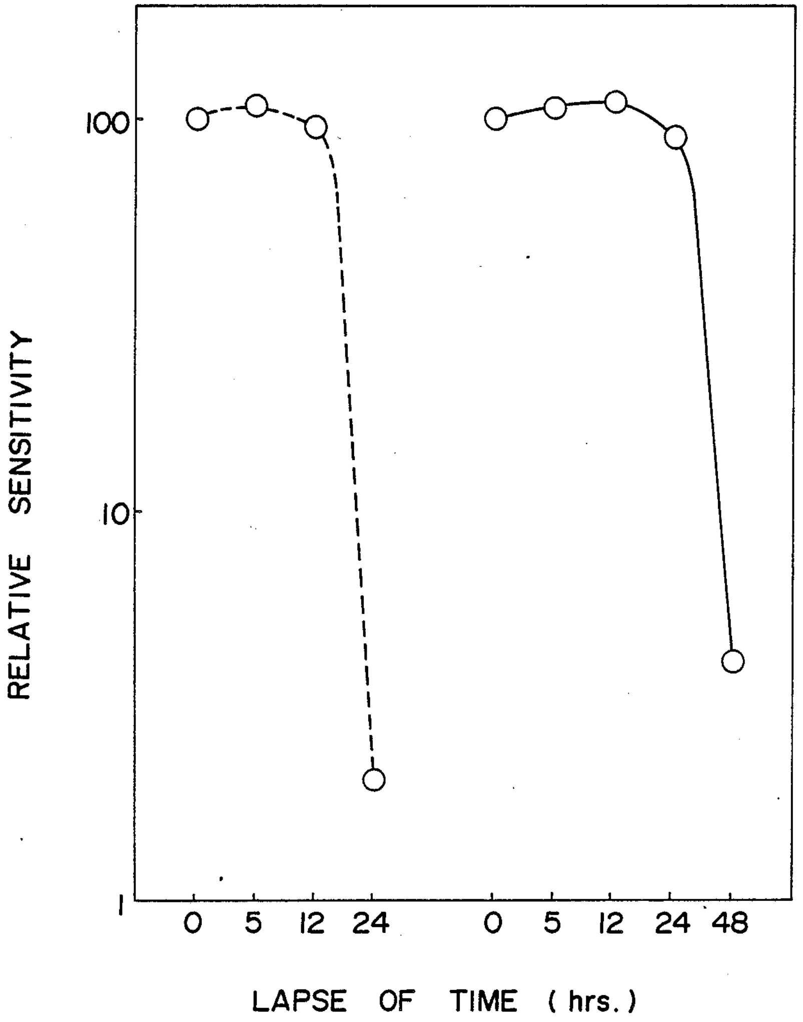
In FIG. 1, the solid curve graphically illustrates a relationship between a lapse of time and a relative sensitivity with respect to the radiation image storage panel of the invention (Example 1), and the dotted curve graphically illustrates a relationship therebetween with respect to the radiation image storage panel for comparison (Comparison Example 1).

The radiation image storage panel of the present invention having the above-described advantages can be prepared, for instance, in the following manner.

The support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in U.S. patent application No. 496,278, the phosphor layer-side surface of the support (or the surface of a subbing layer, light-reflecting layer, or light-absorbing layer in the case that such layers are provided on the phosphor layer) may be provided with protruded and depressed portions for enhancement of the sharpness of the image.

On the support, a phosphor layer is formed. The phosphor layer basically comprises a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO{\cdot}xAl_2O_3$:Eu, in which x is a number satisfying the condition of $0.8 \leqq x \leqq 10$, and $M^{II}O{\cdot}xSiO_2$:A, in which $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0<x+y \leqq 0.6$, and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x},M^{2+}{}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX{\cdot}xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively, as described in Japanese Patent Provisional Publication No. 55(1980)-160078;

$(Ba_{1-x},M^{II}{}_x)F_2{\cdot}aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 10^{-2}$, respectively, as described in Japanese Patent Provisional Publication No. 56(1981)-116777;

$(Ba_{1-x},M^{II}{}_x)F_2{\cdot}aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 2 \times 10^{-1}$, respectively, as described in Japanese Patent Provisional Publication No. 57(1982)-23673;

$(Ba_{1-x},M^{II}{}_x)F_2{\cdot}aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in U.S. patent application No. 497,805;

$BaFX{\cdot}xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively, as described in U.S. patent application No. 520,215;

BaFX·xA:$yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0<y \leqq 0.1$, respectively, as described in U.S. patent application No. 502,648;

BaFX·xNaX':$aEu^{2+}$, in which each of X and X' is at least one halogen selected from the group consisting of Cl, Br and I; and x and a are numbers satisfying the conditions of $0<x \leqq 2$ and $0<a \leqq 0.2$, respectively, as described in Japanese Patent Provisional Publication No. 59(1984)-56479;

$M^{II}FX \cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x \leqq 2$, $0<y \leqq 0.2$ and $0<z \leqq 10^{-2}$, respectively, as described in U.S. patent application No. 535,928;

$M^{II}FX \cdot aM^{I}X' \cdot bM'^{II}X''_2 \cdot cM^{III}X'''_3 \cdot xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0<x \leqq 0.5$ and $0<y \leqq 0.2$, respectively, as described in U.S. patent application No. 543,326;

$M^{II}X_2 \cdot aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0<x \leqq 0.2$, respectively, as described in U.S. patent application No. 660,987;

$M^{II}FX \cdot aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leqq a \leqq 4.0$ and $0<x \leqq 0.2$, respectively, as described in U.S. patent application No. 668,464; and $M^{I}X:xBi$, in which $M^{I}$ is at least one alkali metal selected from the group consisting of Rb and Cs; X is at least one halogen selected from the group consisting of Cl, Br and I; and x is a number satisfying the condition of $0<x \leqq 0.2$, as described in Japanese Patent Application No. 60(1985)-70484.

The $M^{II}X_2 \cdot aM^{II}X'_2:xEu^{2+}$phosphor described in the above-mentioned U.S. patent application No. 660,987 may contain the following additives in the following amount per 1 mol of $M^{II}X_2 \cdot aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b \leqq 10.0$, as described in U.S. patent application No. 699,325;

$bKX'' \cdot cMgX'''_2 \cdot dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leqq b \leqq 2.0$, $0 \leqq c \leqq 2.0$, $0 \leqq d \leqq 2.0$ and $2 \times 10^{-5} \leqq b+c+d$, as described in U.S. patent application No. 723,819;

yB, in which y is a number satisfying the condition of $2 \times 10^{-4} \leqq y \leqq 2 \times 10^{-1}$, as described in U.S. patent application No. 727,974;

bA, in which A is at least one oxide selected from the group consisting of $SiO_2$ and $P_2O_5$; and b is a number satisfying the condition of $10^{-4} \leqq b \leqq 2 \times 10^{-1}$, as described in U.S. patent application No. 727,972;

bSiO, in which b is a number satisfying the condition of $0<b \leqq 3 \times 10^{-2}$, as described in Japanese Patent Application No. 59(1984)-240452;

$bSnX''_2$, in which X'' is at least one halogen selected from the group consisting of F, Cl, Br and I; and b is a number satisfying the condition of $0<b \leqq 10^{-3}$, as described in Japanese Patent Application No. 59(1984)-240454;

$bCsX'' \cdot cSnX'''_2$, in which each of X'' and X''' is at least one halogen selected from the group consisting of F, Cl, Br and I; and b and c are numbers satisfying the conditions of $0<b \leqq 10.0$ and $10^{-6} \leqq c \leqq 2 \times 10^{-2}$, respectively, as described in Japanese Patent Application No. 60(1985)-78033; and $bCsX'' \cdot yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b \leqq 10.0$ and $10^{-6} \leqq y \leqq 1.8 \times 10^{-1}$, respectively, as described in Japanese Patent Application No. 60(1985)-78035.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

In the present invention, even the aforementioned stimulable phosphors having unsatisfactory water-vapor resistance can be suitably employed without accompanying the deterioration of the phosphors.

In more detail, examples of the phosphors include:

$M^{II}F(X_{1-x},I_x):yEu^{2+}$ phosphor, in which $M^{II}$ is at least one alkaline earth metal selected from the group consisting of Ba, Sr and Ca, which includes $BaF(Br_{1-x},I_x):yEu^{2+}$ phosphor, in which x and y are numbers satisfying the conditions of $1 \times 10^{-3} \leqq x < 1.0$ and $0<y \leqq 0.2$, respectively, as described in Japanese Patent Application No. 58(1983)-198758, and other phosphors prepared by incorporating various components into said phosphor;

$M^{II}X_2 \cdot aM^{II}X'_2:xEu^{2+}$ phosphor as described in U.S. patent application No. 660,987 and other phosphors prepared by incorporating various components into said phosphor;

$M^{I}X:xBi$ phosphor as described in Japanese Patent Application No. 60(1985)-70484 and other phosphors prepared by incorporating various components into said phosphor; and LnOX:xA phosphor as described in the aforementioned U.S. Pat. No. 4,236,078 and other phosphors prepared by incorporating various components into said phosphor.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The phosphor layer can be formed on the support, for instance, by the following procedure.

In the first place, stimulable phosphor particles and a binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu m$ to 1 mm, preferably from 50 to 500 $\mu m$.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

On the surface of the phosphor layer not facing the support is provided a plastic protective film. In one aspect of the invention, the plastic protective film has a low water vapor transmission.

Examples of the protective film material employable in the invention include a plastic material having a low water vapor transmission and film-forming properties such as polyvinylidene chloride, biaxially oriented polypropylene, high-density polyethylene, polytetrafluoroethylene and polytrifluoroethylene.

The protective film can be provided, for instance, by first preparing a thin film from the above-mentioned material and then placing and fixing it onto the phosphor layer with an appropriate adhesive layer. The protective film may be in the form of plural layers prepared by laminating thin films of the above-mentioned materials.

The protective film of the invention prepared as described above is required to have a water vapor transmission of not higher than 45 $g/m^2 \cdot 24$ hrs., preferably 40 $g/m^2 \cdot 24$ hrs., at a temperature of 60° C. and a relative humidity of 80% RH. The thickness of the protective film is generally within the range of approximately 3 to 25 $\mu m$.

In another aspect of the invention, the protection of the phosphor layer from peameation of water can be done by the characteristic feature that substantially whole side surface of said phosphor layer is coated with a sealing material, the sealing material being kept in contact with the side surface of the phosphor layer by aid of a fixing means arranged in contact therewith on the outer surface thereof.

Figure 3:
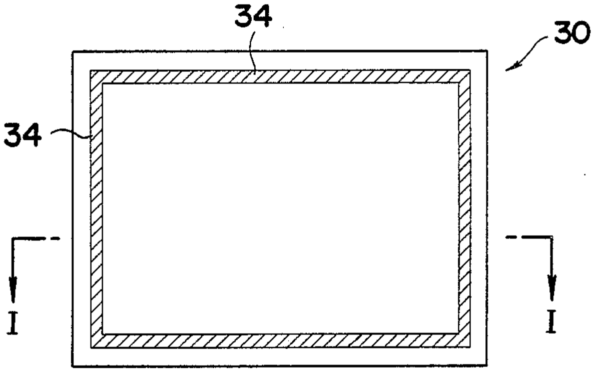
FIG. 3 and FIG. 3-*a* are a plain view of an example of the radiation image storage panel of the invention and a section along the line I—I thereof, respectively.
Figure 3:
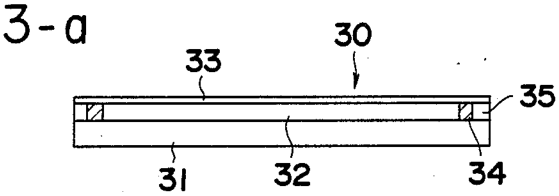

FIGS. 3 and 3-*a* in combination illustrate an example of the radiation image storage panel having the above-described feature. In the FIG. 3 and 3-*a*, a radiation image storage panel 30 comprises a support 31, a phosphor layer 32 and a protective film 33, superposed in this order. The substantially whole side surface of said phosphor layer 32 is coated with a sealing material 34, in which the sealing material 34 is kept in contact with the side surface of the phosphor layer 32 by aid of a fixing means 35 arranged in contact therewith on the outer surface the sealing means 34. The radiation image storage panel generally is in the square or rectangular form. Accordingly, the phosphor layer is preferably coated by the sealing means at all four side surfaces.

The sealing means preferably comprises a water-repellent material having a melting point of not higher than 100° C. such as silicone oil, grease (e.g., petroleum grease and silicone grease) and wax (e.g., paraffin wax, microcrystalline wax, and petrolatum).

The sealing means may be advantageously in the form of a liquid at room temperature. The liquid sealing means can stably protect the side surface of the phosphor layer in the case that the distance between the inner surfaces of the protective layer and the support varies. The surface tension of the liquid sealing means is effective to keep the sufficient covering for the side surface of the phosphor layer.

The fixing means serves to keep the sealing means in contact with the side surface of the phosphor layer.

The fixing means may be made of a self-supporting material such as resin material, as illustrated in FIG. 3. In FIG. 3, the resin-made fixing means 35 serves to keep the sealing means 34 in contact with the side surface of the phosphor layer 32.

Figure 4:
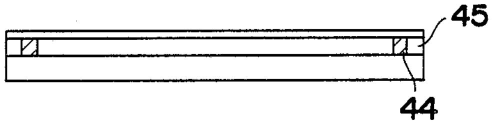
FIGS. 4 to 6 are sections illustrating other examples of the constitution of the radiation image storage panel of the invention.

The fixing means may be made of the same composition as the phosphor layer, as illustrated in FIG. 4. In FIG. 4, the fixing means 45 made of the same composition of the phosphor layer serves to keep the sealing means 44 in contact with the side surface of the phosphor layer. The fixing means 45 can be a separated portion of the phosphor layer which is formed by cutting off a portion of the phosphor layer.

Figure 5:
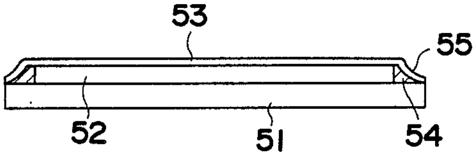

The fixing means may be composed of an extended portion of the protective layer, as illustrated in FIG. 5. In FIG. 5, the fixing means 55 composed of an extended portion of the protective layer to keep the sealing means 54 in contact with the side surface of the phosphor layer.

Figure 6:
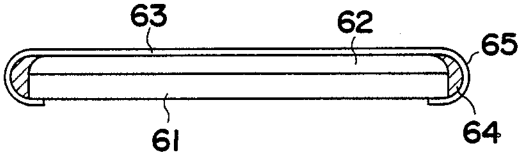

In one embodiment, the fixing means composed of an extended portion of the protective layer reaches to the reverse surface of the support at it front portion, as illustrated in FIG. 6. In FIG. 6, the front edge of the fixing means 65 composed of an extended portion of the protective layer to keep the sealing means 64 in contact with the side surface of the phosphor layer.

In another aspect of the invention, the protection of the phosphor layer from peameation of water can be done by the characteristics feature that substantially whole side surface of said phosphor layer is coated with an extended portion of the protective layer which is in part in contact with an extended portion of the support, the area at which the both extended portions are in contact with each other being sealed with a sealing means.

Figure 7:
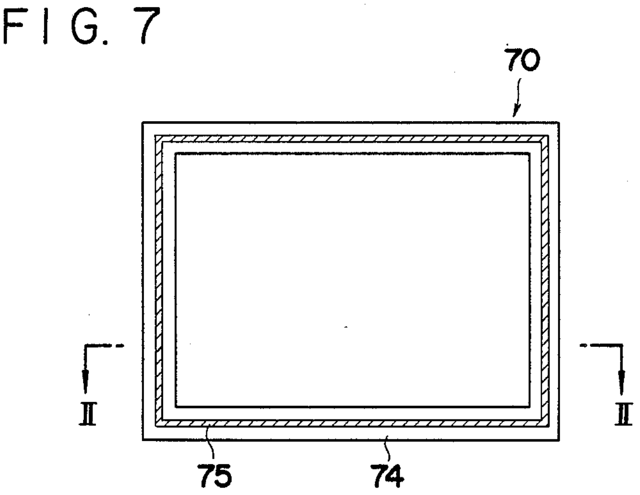
FIG. 7 and FIG. 7-*a* are a plain view of an example of the radiation image storage panel of the invention and a section along the line II—II thereof, respectively.
Figure 7:
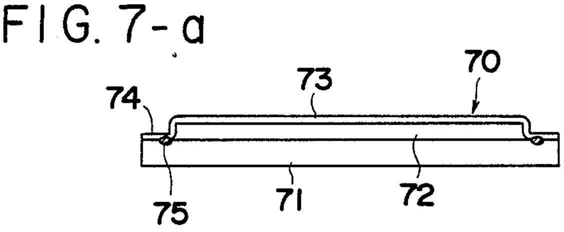

FIGS. 7 and 7-*a* in combination illustrate an example of the radiation image storage panel having the above-described feature. In the FIG. 7 and 7-*a*, a radiation image storage panel 70 comprises a support 71, a phosphor layer 72 and a protective film 73, superposed in this order.

The substantially whole side surface of said phosphor layer 72 is coated with an extended portion 74 of the protective layer 73 which is in part in contact with and extended portion of the support 71. The area at which the both extended portions are in contact with each other is sealed with a sealing means 75. As described hereinbefore, the radiation image storage panel generally is in the square or rectangular form. Accordingly, the phosphor layer is preferably protected by the sealing means at all four side surfaces from peameation of water-vapor.

The area at which the both extended portions are in contact with each other is preferably combined to each other by means of an adhesive according to the known art. The adhesive can be chosen from the known adhesives such as acrylic adhesives, cyanoacrylic adhesives, epoxy adhesives, and polyurethane adhesives.

The sealing means as mentionied hereinbefore can be employed in this embodiment.

Figure 8:
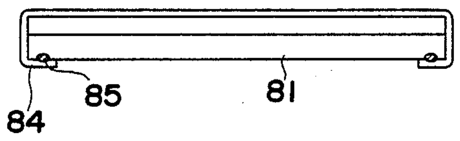
FIG. 8 is a section illustrating other example of the constitution of the radiation image storage panel of the invention.

In one embodiment, the extended portion 84 of the protective film further extends to contact the reverse surface of the support 81, and the sealing means 85 is arranged on the reverse side of the support 81, as illustrated in FIG. 8.

The radiation image storage panel of the invention may be colored with a colorant to enhance the sharpness of the resulting image as described in U.S. Pat. No. 4,394,581 and U.S. patent application Ser. No. 326,642. For the same purpose, the phosphor layer of the radiation image storage panel may contain a white powder as described in U.S. Pat. No. 4,350,893.

The following examples further illustrates the present invention, but these examples are by no means understood to restrict the invention.

EXAMPLE 1

To a mixture of a particulate divalent europium activated barium chlorobromide ($BaClBr:Eu^{2+}$) phosphor and a linear polyester resin were added successively methyl ethyl ketone and nitrocellulose (nitration degree: 11.5%), to prepare a dispersion containing the phosphor particles. Subsequently, tricresyl phosphate, n-butanol and methyl ethyl ketone were added to the dispersion. The mixture was sufficiently stirred by means of a propeller agitator to obtain a homogeneous coating dipersion having a mixture ratio of 1:20 (binder: phosphor, by weight) and a viscosity of 25–35 PS (at 25° C.).

The coating dispersion was applied evenly onto a polyethylene terephthalate sheet containing titanium dioxide (support, thickness: 250 μm) placed horizontally on a glass plate. The application of the coating dispersion was carried out using a doctor blade. After the coating was complete, the support having a layer of the coating dispersion was placed in an oven and heated at a temperature gradually rising from 25° to 100° C. Thus, a phosphor layer having a thickness of approx. 200 μm was formed on the support.

On the phosphor layer was placed a transparent film of biaxially oriented polypropylene (water vapor transmission: 30 $g/m^2 \cdot 24$ hrs., thickness: 20 μm; provided with a polyester adhesive layer on one surface) to combine the transparent film and the phosphor layer with the adhesive layer.

Thus, a radiation image storage panel consisting essentially of a support, a phosphor layer and a transparent protective film.

COMPARISON EXAMPLE 1

The procedure of Example 1 was repeated except for using a polyethylene terephthalate film (water vapor transmission: 50 $g/m^2 \cdot 24$ hrs., thickness: 25 μm) as a protective film material, to prepare a radiation image storage panel consisting essentially of a support, a phosphor layer and a transparent protective film.

EVALUATION

The radiation image storage panels prepared in Example 1 and Comparative Example 1 were evaluated on the deterioration with lapse of time by the following test.

The radiation image storage panel was allowed to stand for a certain period of time at a temperature of 60° C. and a humidity of 80% RH. The panel was then excited with a He-Ne laser beam (wavelength: 632.8 nm) after having been exposed to X-rays at 80 KVp, to measure the sensitivity of the panel (i.e., luminance of stimulated emission). The radiation image storage panel was evaluated on the deterioration based on variation of the sensitivity with time.

The results are shown in FIG. 1.

FIG. 1 graphically shows the following relationship:

Solid curve: a graph illustrating a relationship between a lapse of time and a relative sensitivity with respect to the radiation image storage panel of the invention (Example 1); and Dotted curve: a graph illustrating a relationship between a lapse of time and a relative sensitivity with respect to the radiation image storage panel for comparison (Comparison Example 1).

As is clear from FIG. 1, the radiation image storage panel of the invention hardly reduced in the sensitivity even after 24 hours under the conditions of a temperature of 60° C. and a humidity of 80% RH, but the radiation image storage panel for comparison steeply reduced in the sensitivity under the same conditions to show decrease of approx. two figures as compared with the panel of the invention.

EXAMPLE 2

10 g. of a particulate divalent europium activated barium chlorobromide ($BaClBr: Eu^{2+}$) stimulable phosphor was sandwiched between two transparent films of polyvinylidene chloride (water vapor transmission: 40 $g/m^2 \cdot 24$ hrs., thickness: 10 μm, size: 12 cm×12 cm). The films having the stimulable phosphor therebetween was then coated on every side edge with silicone grease in such a manner that the coated silicone grease would have a depth of 1 cm, to seal up the films. Thus, a test sample was prepared.

COMPARISON EXAMPLE 2

The procedure of Example 2 was repeated except for using a polyethylene terephthalate transparent film (water vapor transmission: 50 $g/m^2 \cdot 24$ hrs., thickness: 25 μm) instead of polyvinylidene chloride film, to prepare a test sample.

EVALUATION

The test samples prepared in Example 2 and Comparison Example 2 were evaluated on the deterioration with time according to the following test.

The test sample was allowed to stand for a certain period of time at a temperature of 60° C. and a humidity of 80% RH. Subsequently, the phosphor was taken out of the sample and stirred. A portion of the phosphor was then excited with a He-Ne laser beam (wavelength: 632.8 nm) after having been exposed to X-rays at 80 KVp, to measure the luminance of stimulated emission. Based on variation of the luminance of stimulated emission of the phosphor with time, the plastic film employed for the test sample was evaluated on the function as a protective film.

Figure 2:
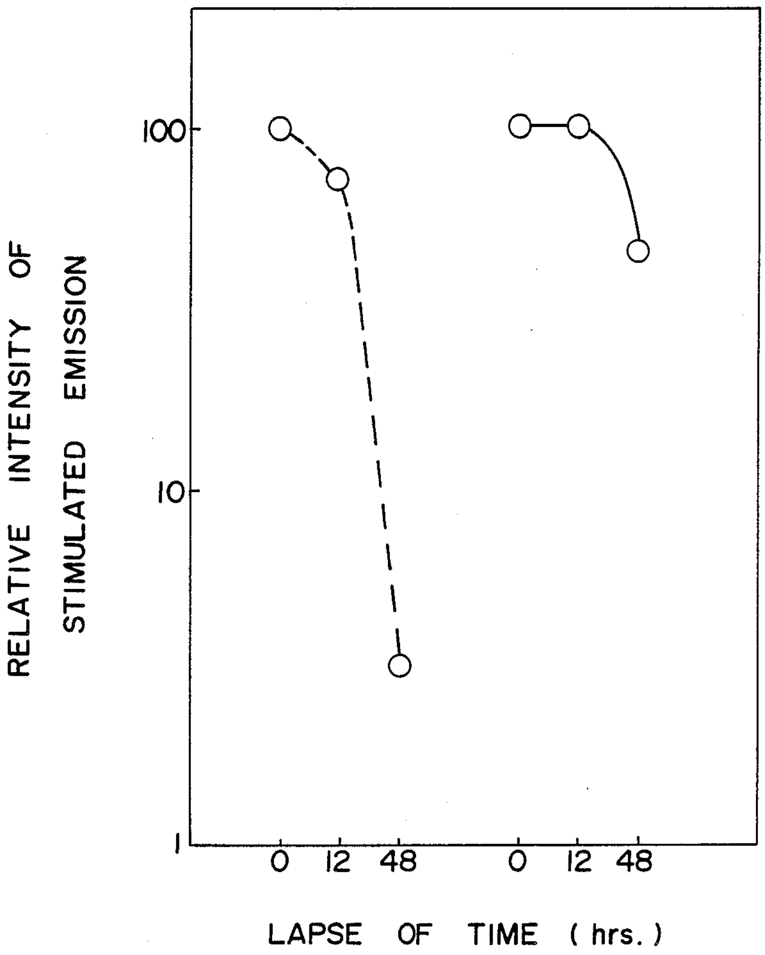
In FIG. 2, the solid curve graphically illustrates a relationship between a lapse of time and a relative sensitivity with respect to the test sample according to the invention (Example 2), and the dotted curve graphically illustrates a relationship therebetween with respect to the test sample for comparison (Comparison Example 2).

The results are shown in FIG. 2.

FIG. 2 graphically shows the following relationship:

Solid curve: a graph illustrating a relationship between a lapse of time and a relative luminance of stimulated emission with respect to the test sample according to the invention (Example 2); and Dotted curve: a graph illustrating a relationship between a lapse of time and a relative luminance of stimulated emission with respect to the test sample for comparison (Comparison Example 2).

As is clear from FIG. 2, the luminance of stimulated emission of the phosphor did not decrease so much even after 48 hours under the conditions of a temperature of 60° C. and a humidity of 80% RH with respect to the test sample according to the invention, and the plastic film employed in the sample was satisfactory for practical use. However, the luminance of stimulated emission of the phosphor with respect to the test sample for comparison reduced under the same conditions to show decrease of approx. two figures as compared with that of the test sample according to the invention.

EXAMPLE 3

The procedure of Example 2 was repeated except for using a different kind of polyvinylidene chloride film (water vapor transmission: 25 $g/m^2 \cdot 24$ hrs., thickness: 15 μm) instead of the polyvinylidene chloride film employed in Example 2, to prepare a test sample.

COMPARISON EXAMPLES 3–4

The procedure of Example 2 was repeated except for using a polyethylene terephthalate film (Comparison Example 3; water vapor transmission: 130 $g/m^2 \cdot 24$ hrs., thickness: 10 μm) and a polyethylene terephthalate film (Comparison Example 4; water vapor transmission: 90 $g/m^2 \cdot 24$ hrs., thickness: 15 μm) instead of polyvinylidene chloride film, to prepare test samples.

The test samples prepared in Example 3 and Comparison Examples 3 and 4 were evaluated on the deterioration with time according to the above-described test.

The results are set forth in Table 1, in which relative luminance of stimulated emission is expressed by a value measured after 48 hours based on the primary value before the test being 100, and the results on the evaluation of the test samples prepared in Example 2 and Comparison Example 2 are also set forth.

TABLE 1

| | | Thickness (μm) | Water Vapor Transmission ($g/m^2 \cdot 24$ hrs.) | Relative Luminance |
|---|---|---|---|---|
| Example | 2 | 10 | 40 | 49 |
| | 3 | 15 | 25 | 95 |
| Com. Example | 2 | 25 | 50 | 4.4 |
| | 3 | 10 | 130 | $<1$ |
| | 4 | 15 | 90 | $<1$ |

As is evident from Table 1, the luminance of stimulated emission of the phosphor hardly reduced even after 48 hours under the conditions of a temperature of 60° C. and a humidity of 80% RH with respect to the test sample according to the invention (Example 3), and the plastic film employed in the samples was satisfactory for practical use. However, the luminance of stimulated emission of the phosphor with respect to the test samples for comparison (Comparison Examples 3 and 4) reduced under the same conditions to show decrease of more than approx. two figures as compared with that of the test sample according to the invention, and the luminance of stimulated emission thereof was unable to be measured.

We claim:

1. A radiation image storage panel comprising a support, a phosphor layer which comprises a binder and a stimulable phosphor dispersed therein and a protective film, superposed in this order, which is characterized in that substantially a whole side surface of said phosphor layer is coated with a sealing means comprising a water-repellent material having a melting point of not higher than 100° C., the sealing material being kept in contact with the side surface of the phosphor layer by aid of a fixing means arranged in contact therewith on the outer surface thereof.

2. The radiation image storage panel as claimed in claim 1, in which said sealing means comprises a water-repellent material in the form of a liquid at room temperature.

3. The radiation image storage panel as claimed in claim 1, in which said sealing means comprises a water-repellent material selected from the group consisting of silicone oil, grease and wax.

4. The radiation image storage panel as claimed in claim 1, in which said fixing means comprises the same composition as the phosphor layer.

5. The radiation image storage panel as claimed in claim 1, in which said fixing means is composed of an extended portion of the protective layer.

6. The radiation image storage panel as claimed in claim 1, in which said fixing means is a self-supporting means arranged on the support.

7. A radiation image storage panel comprising a support, phosphor layer which comprises a binder and a stimulable phosphor dispersed therein and a protective film, superposed in this order, which is characterized in that substantially a whole side surface of said phosphor layer is coated with an extended portion of the protective film which is in part in contact with an extended portion of the support, the area at which the both extended portions are in contact with each other being sealed with a sealing means comprising a water-repellent material having a melting point of not higher than 100° C.

8. The radiation image storage panel as claimed in claim 7, in which said sealing means comprises a water-repellent material in the form of a liquid at room temperature.

9. The radiation image storage panel as claimed in claim 7, in which said sealing means comprises a water-repellent material selected from the group consisting of silicone oil, grease and wax.

10. The radiation image storage panel as claimed in any one of claims 1 and 7, in which said stimulable phosphor is a divalent europium activated alkaline earth metal fluorohalide phosphor having the formula:

$$M^{II}F(X_{1-x},I_x):yEu^{2+},$$

in which $M^{II}$ is at least one alkaline earth metal selected from the group consisting of Ba, Sr and Ca; X is at least one halogen selected from the group consisting of Cl and Br; and x and y are numbers satisfying the conditions of $0<x\leqq 1.0$ and $0<y\leqq 0.2$, respectively.

11. The radiation image storage panel as claimed in any one of claims 1 and 7, in which said stimulable phosphor is a divalent europium activated alkaline earth metal halide phosphor having the formula:

$$M^{II}X_2\cdot aM^{II}X'_2:xEu^{2+}$$

in which $M^{II}$ is at least one alkaline earth metal selected from the group consisting of Ba, Sr and Ca; each of X and X' is at least one halogen selected from the group consisting of Cl, Br and I, and $X\neq X'$; and a and x are numbers satisfying the conditions of $0.1\leqq a\leqq 10.0$ and $0<x\leqq 0.2$, respectively.

12. The radiation image storage panel as claimed in any one of claims 1 and 7, in which said stimulable phosphor is a bismuth activated alkali metal halide phosphor having the formula:

$$M^{I}X:xBi$$

in which $M^{I}$ is at least one alkali metal selected from the group consisting of Rb and Cs; X is at least one halogen selected from the group consisting of Cl, Br and I; and x is a number satisfying the condition of $0<x\leqq 0.2$.

13. The radiation image storage panel as claimed in any one of claims 1 and 7, in which said stimulable phosphor is a rare earth element activated rare earth oxyhalide phosphor having the formula:

$$LnOX:xA$$

in which Ln is at least one rare earth element selected from the group consisting of La, Y, Gd and Lu; X is at least one halogen selected from the group consisting of Cl and Br; A is at least one rare earth element selected from the group consisting of Ce and Tb; and x is a number satisfying the condition of $0<x<0.1$.

* * * * *